(12) United States Patent
Sterzbach

(10) Patent No.: US 11,609,690 B2
(45) Date of Patent: Mar. 21, 2023

(54) METHOD FOR MANUALLY ADJUSTING A NUMERICAL VALUE DISPLAYED ON A TOUCH SCREEN, AND MEASUREMENT DEVICE

(71) Applicant: Rohde & Schwarz GmbH & Co. KG, Munich (DE)

(72) Inventor: Bernhard Sterzbach, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 85 days.

(21) Appl. No.: 17/067,923

(22) Filed: Oct. 12, 2020

(65) Prior Publication Data
US 2022/0113858 A1    Apr. 14, 2022

(51) Int. Cl.
    G06F 3/0484     (2022.01)
    G06F 3/04847    (2022.01)
    G06F 3/04842    (2022.01)
(52) U.S. Cl.
    CPC ...... G06F 3/04847 (2013.01); G06F 3/04842 (2013.01); *G06F 3/0484* (2013.01); *G06F 2203/04101* (2013.01)
(58) Field of Classification Search
    None
    See application file for complete search history.

(56) References Cited

U.S. PATENT DOCUMENTS

2009/0158194 A1*  6/2009  Jensen ................. G06F 3/0481
                                               715/780
2014/0132531 A1*  5/2014  Lee .......................... G06F 3/01
                                               345/173
2014/0258899 A1*  9/2014  Mantuano .......... G06F 3/04883
                                               715/765
2014/0319232 A1* 10/2014  Gourlay ................ F24F 11/523
                                               236/1 C
2015/0355805 A1* 12/2015  Chandler ............ G06F 3/04817
                                               715/784
2017/0102846 A1*  4/2017  Ebler ...................... A61M 1/14
2021/0034234 A1*  2/2021  Woo ...................... G06F 3/0482

FOREIGN PATENT DOCUMENTS

EP       2144385 A2    1/2010
JP     2016024150 A    2/2016

OTHER PUBLICATIONS

U.S. Appl. No. 16/876,827, filed May 18, 2020, corresponding to EP 19209358.1.

* cited by examiner

*Primary Examiner* — Xuyang Xia
(74) *Attorney, Agent, or Firm* — Ditthavong, Steiner & Mlotkowski

(57) ABSTRACT

A method for manually adjusting a numerical value displayed on a touch screen is provided. The method includes: displaying a multi-digit numerical value on the touch screen; selecting at least one digit of the displayed numerical value in response to sensing, by the touch screen, a first touch input operation; and adjusting a value of the at least one selected digit in response to sensing, by the touch screen, a second touch input operation differing from, and seamlessly following, the first touch input operation. A measurement device having corresponding features is provided, too. The method and the device respectively enable intuitive manual adjustment of the displayed numeric value without looking at the touch screen repeatedly and with a selectable rate of adjustment in value.

18 Claims, 4 Drawing Sheets

METHOD FOR MANUALLY ADJUSTING A NUMERICAL VALUE DISPLAYED ON A TOUCH SCREEN, AND MEASUREMENT DEVICE

TECHNICAL FIELD

The present invention relates to a method for manually adjusting a numerical value displayed on a touch screen, and to a measurement device having corresponding features.

BACKGROUND ART

Known measurement devices comprise a touch-sensitive display and include mechanical and/or graphical user interface (UI) controls such as left/right, up/down, plus/minus, spin controls, and the like.

Typically, selection of a digit of a displayed numerical value and adjustment of its value involves actuating a plurality of such controls. For example, a digit may be singled out using left/right or spin controls, and selected for adjustment by changing to up/down or plus/minus controls, or by confirming the singled-out digit by actuating some other control. A value of the selected digit may then be adjusted using the up/down, plus/minus or spin controls, for example.

This illustrative UI procedure requires a user of the measurement device to look at the touch-sensitive display repeatedly, and therefore lacks intuition. Further, in connection with up/down and plus/minus controls, a rate of adjustment is substantially constant. Furthermore, in connection with all the mentioned controls, only individual digits may be singled out and adjusted in value.

SUMMARY OF THE INVENTION

The object of the present invention is thus to provide methods and devices enabling intuitive manual adjustment of a number of digits of a displayed numeric value without looking at the touch-sensitive display repeatedly and with a selectable rate of adjustment.

The invention is defined by the appended independent claims. Preferred embodiments are set forth in the dependent claims and in the following description and drawings.

According to a first aspect, a method is provided for manually adjusting a numerical value displayed on a touch screen. The method comprises: displaying a multi-digit numerical value on the touch screen; selecting at least one digit of the displayed numerical value in response to sensing, by the touch screen, a first touch input operation; and adjusting a value of the at least one selected digit in response to sensing, by the touch screen, a second touch input operation differing from, and seamlessly following, the first touch input operation.

Preferably, the first touch input operation comprises establishing a touch contact in a screen plane of the touch screen within a predetermined distance from a respective center of the at least one digit.

Preferably, the first touch input operation comprises maintaining and moving the touch contact in the screen plane of the touch screen in a substantially parallel direction with respect to a base line of the displayed numerical value.

Preferably, the second touch input operation comprises maintaining and moving the touch contact on the touch screen outside of the predetermined distance from a center of a most or least significant digit of the at least one selected digit.

Preferably, the second touch input operation comprises moving the touch contact on the touch screen in a substantially perpendicular direction with respect to the base line of the displayed numerical value.

Preferably, the second touch input operation comprises moving the touch contact on the touch screen in a substantially circular direction.

Preferably, adjusting the value of the at least one selected digit comprises adjusting the value of the at least one selected digit proportional to a distance magnitude or velocity magnitude along the direction of the second touch input operation.

Preferably, the second touch input operation comprises mutually opposite orientations.

Preferably, adjusting the value of the at least one selected digit comprises increasing the value of the at least one selected digit in accordance with one of the mutually opposite orientations of the second touch input operation.

Preferably, adjusting the value of the at least one selected digit comprises decreasing the value of the at least one selected digit in accordance with the other one of the mutually opposite orientations of the second touch input operation.

Preferably, adjusting the value of the at least one selected digit comprises adjusting a value of a more significant digit of the at least one selected digit in response to a carry-over of the adjusting of the value of the at least one selected digit.

According to a second aspect, a measurement device is provided. The device comprises a touch screen being operable to display a multi-digit numerical value, sense a first touch input operation, and sense a second touch input operation; and a processing unit being operable to select at least one digit of the displayed numerical value in response to the sensing of the first touch input operation; and to adjust a value of the at least one selected digit in response to the sensing of the second touch input operation differing from, and seamlessly following, the first touch input operation.

Preferably, the first touch input operation comprises establishing a touch contact in a screen plane of the touch screen within a predetermined distance from a respective center of the at least one digit.

Preferably, the first touch input operation comprises maintaining and moving the touch contact in the screen plane of the touch screen in a substantially parallel direction with respect to a base line of the displayed numerical value.

Preferably, the second touch input operation comprises maintaining and moving the touch contact on the touch screen outside of the predetermined distance from a center of a most or least significant digit of the at least one selected digit.

Preferably, the second touch input operation comprises moving the touch contact on the touch screen in a substantially perpendicular direction with respect to the base line of the displayed numerical value.

Preferably, the second touch input operation comprises moving the touch contact on the touch screen in a substantially circular direction.

Preferably, the processing unit is operable to adjust the value of the at least one selected digit proportional to a distance magnitude or velocity magnitude along the direction of the second touch input operation.

Preferably, the second touch input operation comprises mutually opposite orientations.

Preferably, the processing unit is operable to increase the value of the at least one selected digit in accordance with one of the mutually opposite orientations of the second touch input operation.

Preferably, the processing unit is operable to decrease the value of the at least one selected digit in accordance with the other one of the mutually opposite orientations of the second touch input operation.

Preferably, the processing unit is operable to adjust a value of a more significant digit of the at least one selected digit in response to a carry-over of the adjusting of the value of the at least one selected digit.

Preferably, the numerical value comprises a parameter of a measurement.

Preferably, the numerical value comprises a parameter of the measurement device.

The present disclosure provides methods and devices respectively enabling intuitive manual adjustment of a number of digits of a numeric value being displayed on a touch screen without looking at the touch screen more than once and with a selectable rate of adjustment in value.

Further aspects, advantages and objects of the invention will become evident for the skilled reader by means of the following detailed description of the embodiments of the invention, when taking into conjunction with the figures of the enclosed drawings.

FIGS. 3A-4D illustrate the first touch input operation in more detail.

The invention will now be described with respect to various embodiments. The features of these embodiments may be combined with each other unless specified otherwise.

Figure 1:
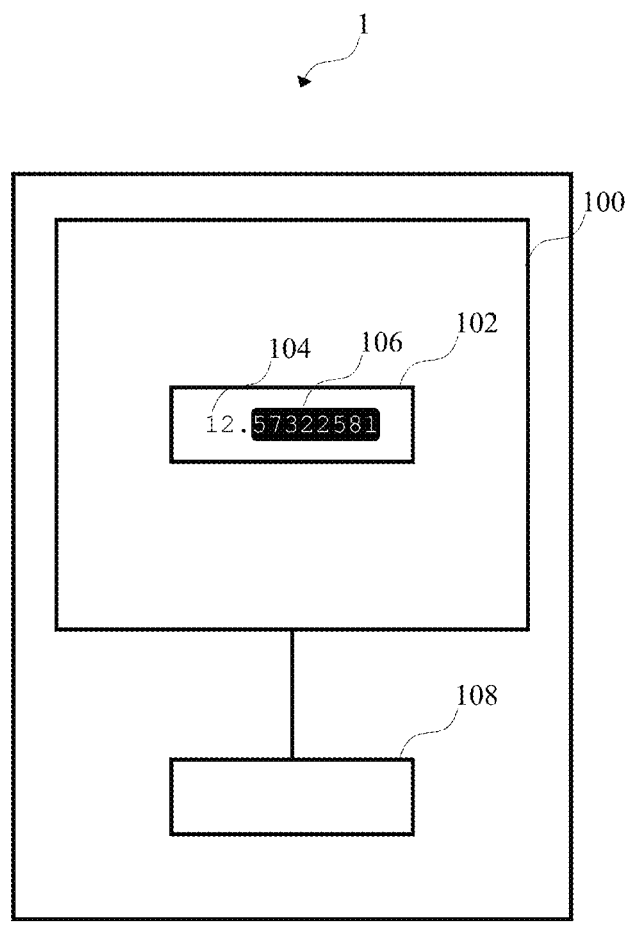
FIG. 1 illustrates a measurement device according to an embodiment of the present disclosure.

FIG. 1 illustrates a measurement device 1 according to an embodiment of the present disclosure.

The measurement device 1 comprises a touch screen 100 and a processing unit 108.

The touch screen 100 is operable to display a multi-digit numerical value 102, to sense a first touch input operation, and to sense a second touch input operation.

The multi-digit numerical value 102 may have a high precision, e.g., 8 decimal digits, as exemplarily shown in FIG. 1.

The first touch input operation will be explained in more detail in connection with FIGS. 3A-3D, and the second touch input operation will be specified in greater detail in connection with FIGS. 4A-4D.

The processing unit 108 is operable to select at least one digit 104 of the displayed numerical value 102 in response to the sensing of the first touch input operation.

As shown in FIG. 1, in response to the selecting, the at least one selected digit 106 may be highlighted on the touch screen 100 by emphasizing its background, its periphery, by blinking, etc.

The processing unit 108 is further operable to adjust a value of the at least one selected digit 106 in response to the sensing of the second touch input operation differing from, and seamlessly following, the first touch input operation.

Further embodiments of the measurement device 1 defined by varieties of the first touch input operation and/or the second touch input operation are described in more detail in connection with FIGS. 3A-3D and 4A-4C, respectively.

Figure 2:
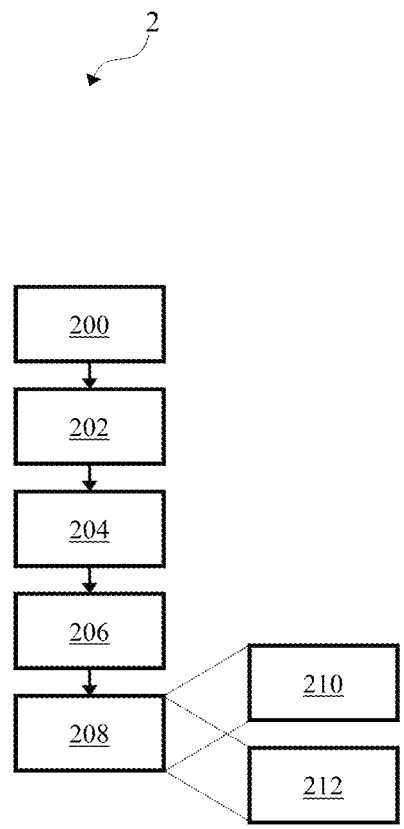
FIG. 2 illustrates a flow chart of a method according to an embodiment of the present disclosure.

FIG. 2 illustrates a flow chart of a method 2 according to an embodiment of the present disclosure.

The method 2 is for manually adjusting a numerical value 102 displayed on a touch screen 100, such as illustrated in FIG. 1.

The method 2 comprises a step of displaying 200, by the touch screen 100, a multi-digit numerical value 102 on the touch screen 100.

The method 2 comprises a step of sensing 202, by the touch screen 100, a first touch input operation.

The method 2 comprises a step of selecting 204 at least one digit 104 of the displayed numerical value 102 in response to the sensing 202 of the first touch input operation.

The method 2 comprises a step of sensing 206, by the touch screen 100, a second touch input operation differing from, and seamlessly following, the first touch input operation The method 2 comprises a step of adjusting 208 a value of the at least one selected digit 106 in response to the sensing 206 of the second touch input operation.

The second touch input operation may comprise mutually opposite orientations.

The adjusting 208 the value of the at least one selected digit 106 may comprise increasing 210 the value of the at least one selected digit 106 in accordance with one of the mutually opposite orientations of the second touch input operation. In FIG. 2, the increasing 210 step is represented to the right above the adjusting 208 step, and the connecting dotted lines indicate that the adjusting 208 step may comprise the increasing 210 step.

Alternatively or additionally, the adjusting 208 the value of the at least one selected digit 106 may comprise decreasing 212 the value of the at least one selected digit 106 in accordance with the other one of the mutually opposite orientations of the second touch input operation. In FIG. 2, the decreasing 212 step is represented to the right below the adjusting 208 step, and the connecting dotted lines indicate that the adjusting 208 step may comprise the decreasing 212 step.

Additionally, the adjusting 208 the value of the at least one selected digit 106 may comprise adjusting a value of a more significant digit of the at least one selected digit 106 in response to a carry-over of the adjusting 208 of the value of the at least one selected digit 106. In other words, positive and negative carry-overs may be taken into account when increasing 210 and decreasing 212 the value of the at least one selected digit 106, respectively.

FIGS. 3A-4D illustrate the first touch input operation in more detail.

Figure 3A:
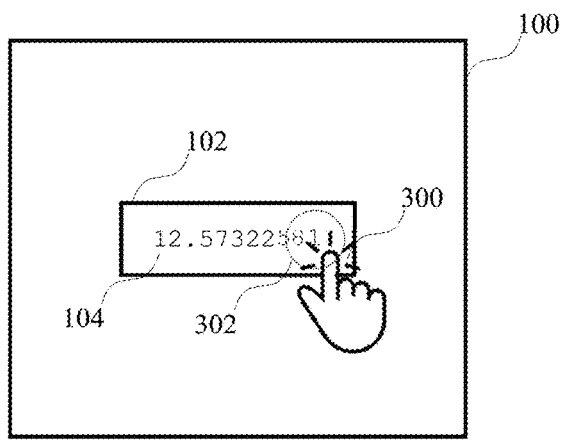

FIG. 3A illustrates a first touch input operation on the touch screen 100 of the measurement device 1 of FIG. 1.

The touch screen 100 is operable to display a multi-digit numerical value 102, which, in other words, comprises at least one digit 104.

The touch screen 100 is further operable to sense a first touch input operation.

According to FIG. 3A, the first touch input operation may comprise establishing a touch contact 300 in a screen plane of the touch screen 100 within a predetermined distance 302 from a respective center of the at least one digit 104. FIG. 3A shows a point-type first touch input operation, and a dotted circle enclosing the center of the digit 104 having a value of "1" and being approached by the touch contact 300. This dotted circle has a radius that corresponds to the predetermined distance 302 and captures the point-type first touch input operation. In other words, the point-type first touch input operation singles out only the least significant digit 104 of the displayed numerical value 102 having a value of "1".

The measurement device 1, or more precisely, its processing unit 108, is operable to select the singled-out digit 104 of the displayed numerical value 102 in response to the sensing of the first touch input operation.

Figure 3B:
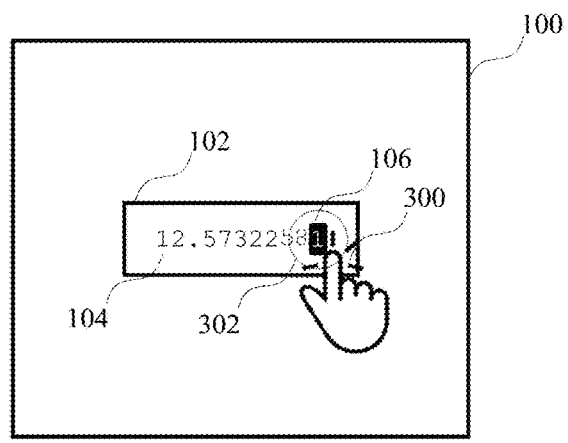

FIG. 3B illustrates that in response to the selecting, the selected digit 106 may be highlighted on the touch screen 100, as already mentioned, here by emphasizing its background.

Figure 3C:
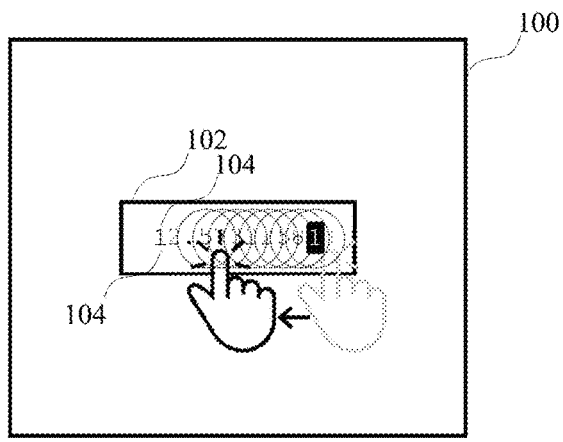

FIG. 3C illustrates a continuation of the first touch input operation of FIGS. 3A-3B.

As indicated by the shaded and solid pointing hand symbols in FIG. 3C, the first touch input operation may comprise maintaining and moving the touch contact 300 in the screen plane of the touch screen 100 in a substantially parallel direction with respect to a base line of the displayed numerical value 102.

A "base line" as used herein may refer to an imaginary line on the touch screen 100 to which lower ends of all the digits 104 of the displayed numerical value 102 are preferably aligned vertically in the screen plane of the touch screen 100. Thus, the substantially parallel direction with respect to the base line of the displayed numerical value 102 preferably is a substantially horizontal direction in the screen plane of the touch screen 100. Although FIG. 3C illustrates moving the touch contact 300 in a substantially left-hand side direction, moving the touch contact 300 in a substantially right-hand side direction is not precluded.

FIG. 3C shows that the touch contact 300 is maintained on the touch screen 100, and moved on the screen plane in the afore-mentioned horizontal direction. It follows that the point-type first touch input operation of FIGS. 3A-3B has become a line-type first touch input operation. FIG. 3C further depicts additional dotted circles enclosing the respective center of the at least one digit 104 swept by the touch contact 300 owing to the line-type first touch input operation. As already mentioned, the dotted circles have a respective radius that corresponds to the predetermined distance 302, and each of the dotted circles captures the line-type first touch input operation. In other words, the line-type first touch input operation singles out the at least one digit 104 of the displayed numerical value 102 having a value of "57322581".

Again, the measurement device 1 is operable to select the at least one singled-out digit 104 of the displayed numerical value 102 in response to the sensing of the first touch input operation.

By maintaining and moving the touch contact 300 in the screen plane of the touch screen 100 in the substantially parallel direction with respect to the base line of the displayed numerical value 102, more than one digit 104 of the displayed numerical value 102 may be selected in accordance with a choice of the user, and therefore be adjusted subsequently.

Figure 3D:
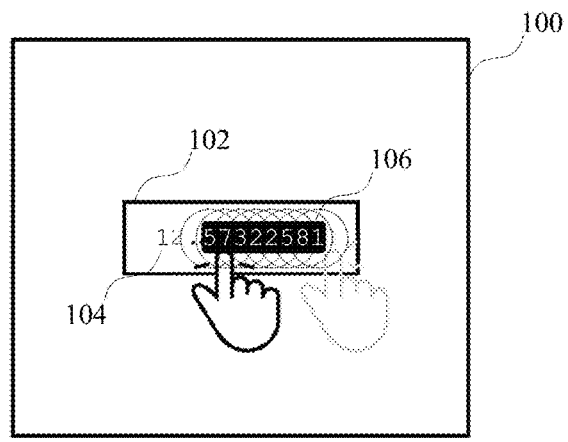

FIG. 3D illustrates that in response to the selecting, the at least one selected digit 106 may be highlighted on the touch screen 100, as already mentioned, here by emphasizing its background.

Figure 4A:
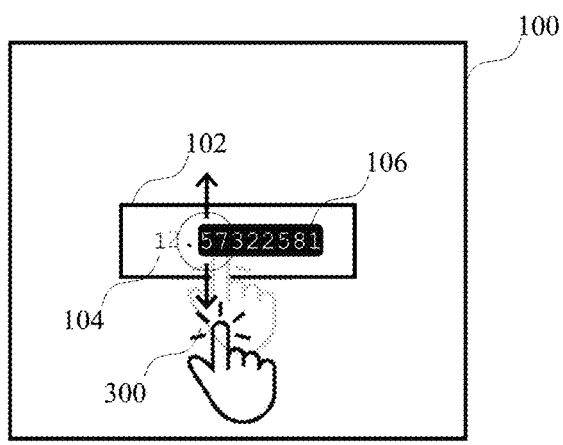
FIGS. 4A-4C illustrate the second touch input operation in more detail.
Figure 4B:
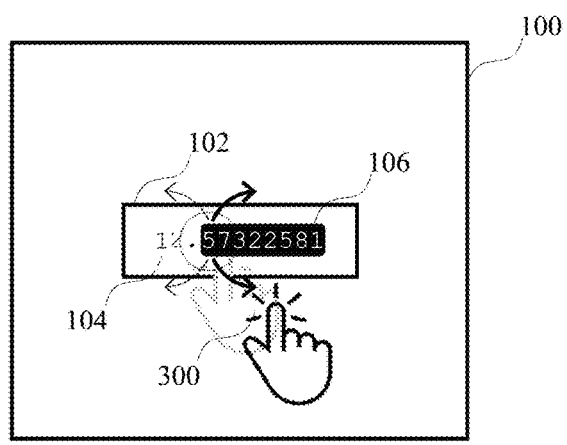
Figure 4C:
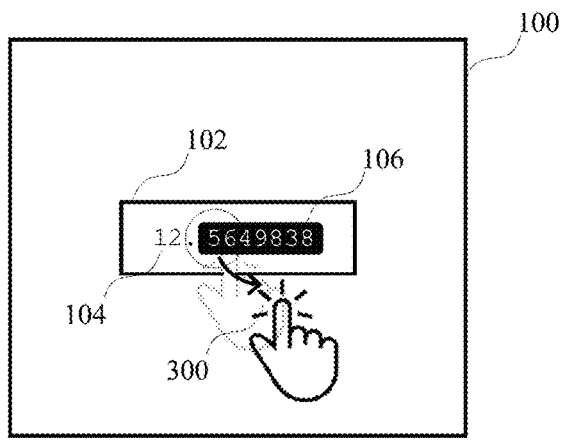

FIGS. 4A-4C illustrate the second touch input operation in more detail.

The second touch input operation differs from, and seamlessly follows, the first touch input operation shown in FIGS. 3A-3D.

FIGS. 4A and 4B show second touch input operations which follow on from the line-type first touch input operation of FIGS. 3C and 3D. However, second touch input operations following the point-type first touch input operation of FIGS. 3A and 3B are not precluded.

As indicated by the shaded and solid pointing hand symbols in FIGS. 4A and 4B, the second touch input operation may comprise maintaining and moving the touch contact 300 on the touch screen 100 outside of the predetermined distance 302 from a center of a most or least significant digit of the at least one selected digit 106.

By the second touch input operation comprising maintaining and moving the touch contact 300 on the touch screen 100 outside of the predetermined distance 302 from the center of the most or least significant digit of the at least one selected digit 106, a (second) touch input operation may be sensed which differs from, but seamlessly follows, the first touch input operation.

By the second touch input operation seamlessly following the first touch input operation, intuitive manual adjustment of a number of digits of the displayed numeric value 106 is enabled without looking at the touch screen more than once.

More specifically, FIG. 4A shows that the second touch input operation may comprise moving the touch contact 300 on the touch screen 100 in a substantially perpendicular direction with respect to the base line of the displayed numerical value 102. In other words, moving the touch contact 300 on the touch screen 100 in a substantially vertical direction beyond the predetermined distance 302 from the center of the most significant digit "5" of the at least one selected digit 106 having the value of "57322581" establishes the second touch input operation differing from, and seamlessly following, the first touch input operation. In particular, the substantially perpendicular direction with respect to the base line may be a substantially linear/straight direction.

Alternatively, FIG. 4B shows that the second touch input operation may comprise moving the touch contact 300 on the touch screen 100 in a substantially circular direction, either in a clockwise or in a counter-clockwise circular direction.

Once the second touch input operation has been sensed, the user is free to move the touch contact 300 in any direction, but the second touch input operation is being continuously sensed in terms of a movement of the touch contact 300 on the touch screen 100.

An adjusting 208 of the value of the at least one selected digit 106 may be proportional to a distance magnitude or velocity magnitude along the direction of the second touch input operation, no matter if the second touch input operation comprises that the touch contact 300 is moved on the touch screen 100 in a substantially linear (see FIG. 4A) or substantially circular (see FIG. 4B) direction. This means that the more expansive the movement, or the faster the velocity, of the touch contact 300 on the touch screen 100 in the substantially linear or substantially circular direction, the higher the adjusting 208 of the value of the at least one selected digit 106 in terms of absolute value. For example, 10 mm of movement or 10 mm of movement per second may correspond to an increment or decrement of the value of the at least one selected digit 106. other scales of increment or decrement are not precluded.

By adjusting the value of the at least one selected digit 106 along the direction of the second touch input operation, the adjusting 208 of the value of the at least one selected digit 106 may be continued without having to move the finger exactly along a linear/straight or circular direction.

By adjusting the value of the at least one selected digit 106 proportional to a distance magnitude or velocity magnitude along the direction of the second touch input operation, the value(s) of the at least one selected digit 106 may be adjusted in accordance with a selectable rate. In other words, the adjustment may be coarser or finer according to an intuitive choice of the user.

In any case, the second touch input operation may comprise mutually opposite orientations. In FIG. 4A, the mutually opposite orientations are indicated as being directed substantially upwards/downwards, whereas FIG. 4B indicates that the mutually opposite orientations may be defined by a substantially clockwise/counter-clockwise starting direction, either to a right-hand side of the most (or least) significant digit of the at least one selected digit 106, and its counter movement (indicated by bold circular arrows), or to a left-hand side of the most (or least) significant digit of the at least one selected digit 106, and its counter movement (indicated by thin circular arrows).

By the second touch input operation comprising mutually opposite orientations, different embodiments may be provided in terms of adjusting 208 the value of the at least one selected digit 106. This may enhance an intuitiveness of the manual adjustment of the displayed numeric value 106.

Adjusting 208 the value of the at least one selected digit 106 may comprise increasing 210 the value of the at least one selected digit 106 in accordance with one of the mutually opposite orientations of the second touch input operation, and/or decreasing 212 the value of the at least one selected digit 106 in accordance with the other one of the mutually opposite orientations of the second touch input operation.

As indicated by the shaded and solid pointing hand symbols in FIG. 4C, the values of "5", "7", "3" "2", "2", "5", "8", and "1" of the at least one selected digit 106 of FIGS. 4A and 4B are exemplarily decreased in accordance with the other one of the mutually opposite orientations of the second touch input operation, namely in a substantially counter-clockwise circular direction (indicated by the bold circular arrow), and proportional to the velocity magnitude along the direction of the second touch input operation, to illustrative values of "5", "6", "4", "9", "8", "3", "8", respectively.

Although FIGS. 3A-4D and 4A-4C illustrate steps of the method 2 of FIG. 2 in more detail, the associated explanatory notes and advantages similarly apply to the corresponding features of the measurement device 1 of FIG. 1.

The invention claimed is:

1. A method of manually adjusting a numerical value displayed on a touch screen, comprising:
    displaying a multi-digit numerical value on the touch screen,
    selecting at least one digit of the displayed numerical value in response to sensing, by the touch screen, a first touch input operation, wherein the first touch input operation comprises maintaining and moving a touch contact in a parallel direction with respect to the displayed numerical value; and
    adjusting a value of the at least one selected digit in response to sensing, by the touch screen, a second touch input operation differing from, and seamlessly following, the first touch input operation,
    wherein the second touch input operation comprises moving the touch contact on the touch screen in a circular direction.

2. The method of claim 1,
    wherein the first touch input operation comprises
    establishing the touch contact in a screen plane of the touch screen within a predetermined distance from a respective center of the at least one digit.

3. The method of claim 2,
    wherein the first touch input operation comprises
    maintaining and moving the touch contact in the screen plane of the touch screen in the parallel direction with respect to a base line of the displayed numerical value.

4. The method of claim 2,
    wherein the second touch input operation comprises
    maintaining and moving the touch contact on the touch screen outside of the predetermined distance from a center of a most or least significant digit of the at least one selected digit.

5. The method of claim 2,
    wherein the second touch input operation comprises
    moving the touch contact on the touch screen in a perpendicular direction with respect to the base line of the displayed numerical value.

6. The method of claim 5,
    wherein adjusting the value of the at least one selected digit comprises
    adjusting the value of the at least one selected digit proportional to a distance magnitude or velocity magnitude along the direction of the second touch input operation.

7. The method of claim 1,
    wherein the second touch input operation comprises mutually opposite orientations.

8. The method of claim 7,
    wherein adjusting the value of the at least one selected digit comprises
    increasing the value of the at least one selected digit in accordance with one of the mutually opposite orientations of the second touch input operation.

9. The method of claim 7,
    wherein adjusting the value of the at least one selected digit comprises
    decreasing the value of the at least one selected digit in accordance with the other one of the mutually opposite orientations of the second touch input operation.

10. The method of claim 1,
    wherein adjusting the value of the at least one selected digit comprises
    adjusting a value of a more significant digit of the at least one selected digit in response to a carry-over of the adjusting of the value of the at least one selected digit.

11. A measurement device, comprising
    a touch screen configured to
        display a multi-digit numerical value,
        sense a first touch input operation, and
        sense a second touch input operation; and
    a processing unit configured to
        select at least one digit of the displayed numerical value in response to the sensing of the first touch input operation, wherein the first touch input operation comprises maintaining and moving a touch contact in a parallel direction with respect to the displayed numerical value; and
        adjust a value of the at least one selected digit in response to the sensing of the second touch input operation differing from, and seamlessly following, the first touch input operation wherein the second touch input operation comprises moving the touch contact on the touch screen in a circular direction.

12. The device of claim 11, wherein the first touch input operation comprises
    establishing the touch contact in a screen plane of the touch screen within a predetermined distance from a respective center of the at least one digit.

13. The device of claim 12,
wherein the first touch input operation comprises
maintaining and moving the touch contact in the screen
plane of the touch screen in the parallel direction with
respect to a base line of the displayed numerical value.

14. The device of claim 12,
wherein the second touch input operation comprises
maintaining and moving the touch contact on the touch
screen outside of the predetermined distance from a
center of a most or least significant digit of the at least
one selected digit.

15. The device of claim 12,
wherein the second touch input operation comprises
moving the touch contact on the touch screen in a substantially perpendicular direction with respect to the
base line of the displayed numerical value.

16. The device of claim 15,
wherein adjusting the value of the at least one selected
digit comprises
adjusting the value of the at least one selected digit
proportional to a distance magnitude or velocity magnitude along the direction of the second touch input
operation.

17. The device of claim 11,
wherein the numerical value comprises a parameter of a
measurement.

18. The device of claim 11,
wherein the numerical value comprises a parameter of the
measurement device.

\* \* \* \* \*